(12) United States Patent
Chen

(10) Patent No.: US 11,914,677 B2
(45) Date of Patent: Feb. 27, 2024

(54) IMAGE PROCESSING METHOD AND APPARATUS, TERMINAL, AND STORAGE MEDIUM

(71) Applicant: Tencent Technology (Shenzhen) Company Limited, Guangdong (CN)

(72) Inventor: Sihong Chen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 293 days.

(21) Appl. No.: 17/459,301

(22) Filed: Aug. 27, 2021

(65) Prior Publication Data
US 2022/0058446 A1  Feb. 24, 2022

Related U.S. Application Data

(63) Continuation of application No. PCT/CN2020/098454, filed on Jun. 28, 2020.

(30) Foreign Application Priority Data

Jul. 12, 2019  (CN) .............................. 201910634411

(51) Int. Cl.
*G06F 18/24* (2023.01)
*G06N 3/045* (2023.01)
(Continued)

(52) U.S. Cl.
CPC ............. *G06F 18/24* (2023.01); *G06N 3/045* (2023.01); *G06T 7/0012* (2013.01); *G06T 7/11* (2017.01);
(Continued)

(58) Field of Classification Search
None
See application file for complete search history.

(56) References Cited

U.S. PATENT DOCUMENTS

2015/0005637 A1\* 1/2015 Stegman .............. A61B 8/5223
  600/449
2017/0337508 A1\* 11/2017 Bogolea ................. G06V 20/52
(Continued)

FOREIGN PATENT DOCUMENTS

CN  106203399 A  12/2016
CN  106529565 A   3/2017
(Continued)

OTHER PUBLICATIONS

International Search Report & Written Opinion dated Oct. 12, 2020 in International Application No. PCT/NC2020/098454 with English translation, 9 pgs.

*Primary Examiner* — Tsung Yin Tsai
(74) *Attorney, Agent, or Firm* — ARENTFOX SCHIFF LLP

(57) ABSTRACT

An image processing method includes obtaining a sample image, a category label of the sample image, and a label value of the category label. The method further includes calling a preset image processing model to perform segmentation processing on the sample image to obtain at least two sub-regions. The method further includes calling the preset image processing model to perform category prediction on the sample image to obtain a predicted value of the category label. The method further includes updating a network parameter of the preset image processing model according to center coordinates of the sub-regions, the label value of the category label, and the predicted value of the category label. The method further includes performing iterative training on the preset image processing model according to the updated network parameter, to obtain a target image processing model.

20 Claims, 5 Drawing Sheets

(51) Int. Cl.
  *G06T 7/11* (2017.01)
  *G06T 7/00* (2017.01)
(52) U.S. Cl.
  CPC .............. *G06T 2207/20081* (2013.01); *G06T 2207/20084* (2013.01); *G06T 2207/30196* (2013.01)

(56) References Cited

U.S. PATENT DOCUMENTS

| | | | |
|---|---|---|---|
| 2018/0005035 A1* | 1/2018 | Bogolea | B25J 11/008 |
| 2019/0171870 A1* | 6/2019 | Vajda | G06T 7/75 |
| 2020/0410890 A1* | 12/2020 | Yamada | A61B 5/055 |
| 2022/0058446 A1* | 2/2022 | Chen | G06F 18/24 |
| 2022/0287619 A1* | 9/2022 | Cleveland | A61B 5/383 |

FOREIGN PATENT DOCUMENTS

| | | | | |
|---|---|---|---|---|
| CN | 108629319 A | | 10/2018 | |
| CN | 108647732 A | | 10/2018 | |
| CN | 110363138 A | * | 10/2019 | ......... G06K 9/00362 |
| CN | 110363138 A | | 10/2019 | |
| WO | WO-2017139927 A1 | * | 8/2017 | ........... G06K 9/3233 |

\* cited by examiner

IMAGE PROCESSING METHOD AND APPARATUS, TERMINAL, AND STORAGE MEDIUM

RELATED APPLICATIONS

This application is a continuation of International Application No. PCT/CN2020/098454, filed on Jun. 28, 2020, which claims priority to Chinese Patent Application No. 201910634411.9, entitled "MODEL TRAINING METHOD, IMAGE PROCESSING METHOD AND APPARATUS, TERMINAL, AND STORAGE MEDIUM" and filed on Jul. 12, 2019. The entire disclosures of the prior applications are hereby incorporated by reference in their entirety.

FIELD OF THE TECHNOLOGY

This application relates to the field of Internet technologies, including an image processing method and apparatus, a terminal, and a computer storage medium.

BACKGROUND OF THE DISCLOSURE

Image processing is a technology that uses computers to analyze images to achieve needed results. In the field of image processing technologies, image category prediction is a particularly important research topic. With the advancement of neural network model research, a method for performing category prediction on an image by using a model to obtain a predicted category of the image is widely recognized. Obtaining a model with high performance is particularly important for the accuracy of subsequent image category prediction.

SUMMARY

Embodiments of this application provide an image processing method and apparatus, a terminal, and a computer storage medium, to improve the accuracy of a target image processing model.

In an embodiment, an image processing method includes obtaining a sample image, a category label of the sample image, and a label value of the category label, the label value indicating whether the sample image comprises an abnormal feature indicated by the category label. The method further includes calling a preset image processing model to perform segmentation processing on the sample image according to a feature similarity between pixels in the sample image, to obtain at least two sub-regions. The method further includes calling, by processing circuitry of a terminal, the preset image processing model to perform category prediction on the sample image according to correlations between the sub-regions and the category label, to obtain a predicted value of the category label. The predicted value indicating a probability that the sample image comprises the abnormal feature indicated by the category label. The method further includes updating, by the processing circuitry of a terminal, a network parameter of the preset image processing model according to center coordinates of the sub-regions, the label value of the category label, and the predicted value of the category label. The method further includes performing iterative training on the preset image processing model according to the updated network parameter, to obtain a target image processing model.

In an embodiment, an image processing apparatus includes processing circuitry configured to obtain a sample image, a category label of the sample image, and a label value of the category label, the label value indicating whether the sample image comprises an abnormal feature indicated by the category label. The processing circuitry is further configured to call a preset image processing model to perform segmentation processing on the sample image according to a feature similarity between pixels in the sample image, to obtain at least two sub-regions. The processing circuitry is further configured to call the preset image processing model to perform category prediction on the sample image according to correlations between the sub-regions and the category label, to obtain a predicted value of the category label. The predicted value indicates a probability that the sample image comprises the abnormal feature indicated by the category label. The processing circuitry is further configured to update a network parameter of the preset image processing model according to center coordinates of the sub-regions, the label value of the category label, and the predicted value of the category label. The processing circuitry is further configured to perform iterative training on the preset image processing model according to the updated network parameter, to obtain a target image processing model.

In an embodiment, a non-transitory computer-readable storage medium stores computer-readable instructions thereon, which, when executed by a terminal, cause the terminal to perform an image processing method. The method includes obtaining a sample image, a category label of the sample image, and a label value of the category label, the label value indicating whether the sample image comprises an abnormal feature indicated by the category label. The method further includes calling a preset image processing model to perform segmentation processing on the sample image according to a feature similarity between pixels in the sample image, to obtain at least two sub-regions. The method further includes calling, by processing circuitry of a terminal, the preset image processing model to perform category prediction on the sample image according to correlations between the sub-regions and the category label, to obtain a predicted value of the category label. The predicted value indicating a probability that the sample image comprises the abnormal feature indicated by the category label. The method further includes updating, by the processing circuitry of a terminal, a network parameter of the preset image processing model according to center coordinates of the sub-regions, the label value of the category label, and the predicted value of the category label. The method further includes performing iterative training on the preset image processing model according to the updated network parameter, to obtain a target image processing model.

BRIEF DESCRIPTION OF THE DRAWINGS

To describe the technical solutions in the embodiments of this application more clearly, the following briefly introduces the accompanying drawings describing the embodiments. The accompanying drawings in the following description show exemplary embodiments of this application, and a person of ordinary skill in the art may derive other drawings from these accompanying drawings.

FIG. K is a schematic structural diagram of an image processing apparatus according to an embodiment of this application.

Figure 9:
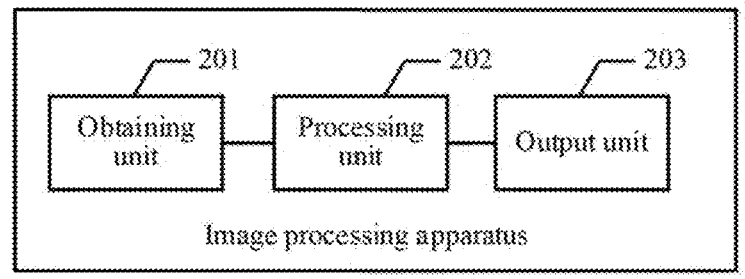

FIG. 9 is a schematic structural diagram of another image processing apparatus according to an embodiment of this application.

Figure 10:
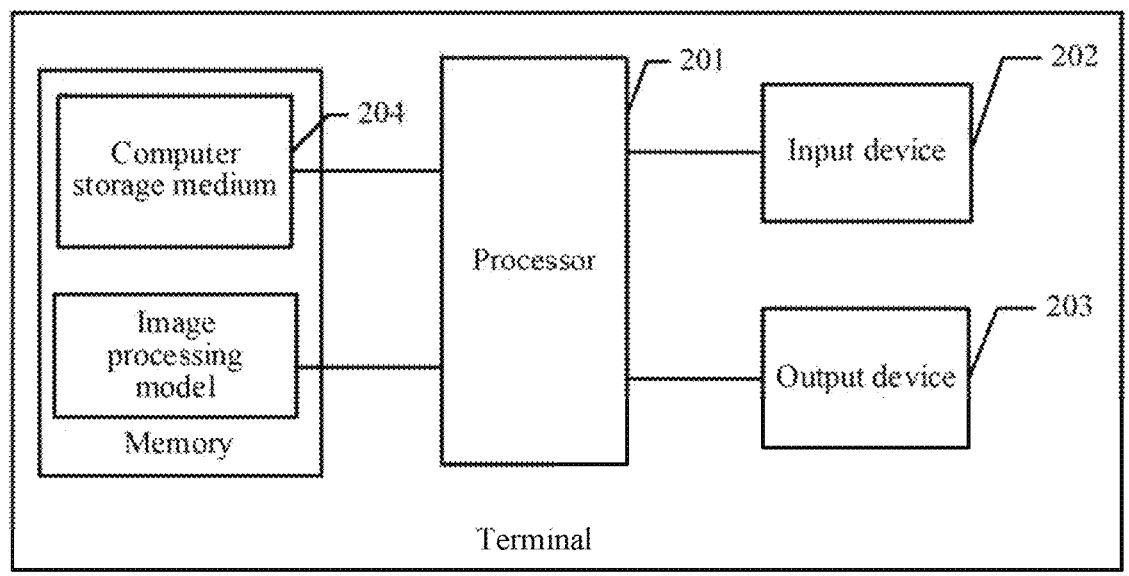

FIG. 10 is a schematic structural diagram of a terminal according to an embodiment of this application.

DETAILED DESCRIPTION

The following describes technical solutions in embodiments of this application with reference to the accompanying drawings in the embodiments of this application.

With the advancement of neural network model research, an image processing method for performing category prediction on an image by calling a model is widely recognized. Studies show that category prediction performance (for example, accuracy) of a model is usually related to a structure of the model. Based on this, an embodiment of this application provides an end-to-end image processing model. The image processing model may segment sub-regions of an image through self-supervised learning without performing segmentation and annotation in advance, which can save annotation resources. The self-supervised learning is a learning manner in which input and output are used as a complete whole, and weakly annotated information provided by input data itself is mined to predict, based on some parts of the input data, other remaining parts. In addition, the image processing model may further improve classification performance while segmenting the sub-regions by performing association analysis on the sub-regions and category features, thereby improving the accuracy of category prediction.

Figure 1A:
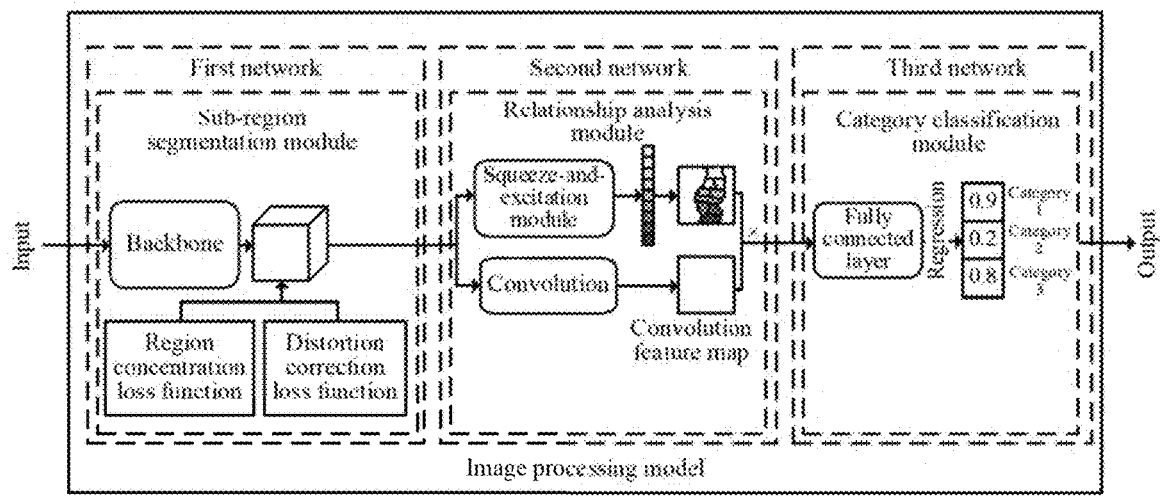
FIG. 1a is a schematic structural diagram of an image processing model according to an embodiment of this application.

The image processing model provided above may be formed by one or more networks. For ease of illustration, an example is used subsequently in which the image processing model includes three networks, to illustrate a specific structure of the image processing model. Referring to FIG. 1a, the image processing model may include a first network, a second network, and a third network, where the first network may include a sub-region segmentation module (SSM) configured to segment an image, the second network may include a relationship analysis module (RAM) configured for association analysis of sub-regions and category features, and the third network may include a category classification module (CCM) configured for category prediction.

Figure 1B:
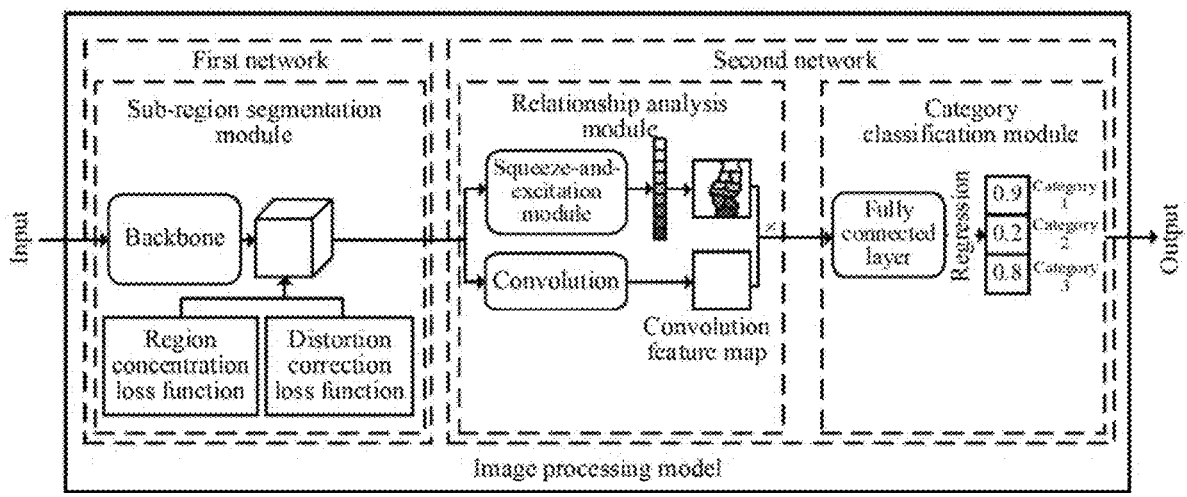
FIG. 1b is a schematic structural diagram of another image processing model according to an embodiment of this application.
Figure 1C:
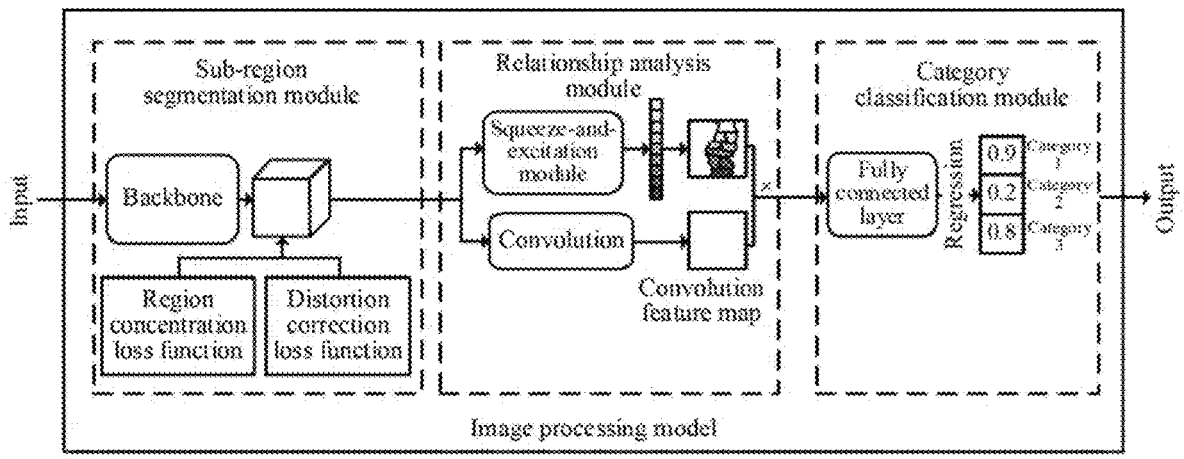
FIG. 1c is a schematic structural diagram of another image processing model according to an embodiment of this application.

The first network may include a Backbone and a loss function. The loss function is used to analyze pixel information in the image, so that pixel features of the same distribution region are as similar as possible, to cluster the pixels, thereby segmenting the sub-regions. The loss function may include: a region concentration loss function, or a region concentration loss function and a distortion correction loss function. The Backbone may include a neural network for feature extraction, such as a 3D-ResNet18 network or a VGG network. The second network may include a squeeze-and-excitation module (SE block) for pooling processing and a convolution layer (Conv). The third network may include a fully connected layer (FC). FIG. 1a only schematically represents a model structure of the image processing model, and does not limit the model structure of the image processing model provided in this embodiment of this application. For example, a quantity of networks included in the image processing model is not limited to the three shown in FIG. 1a. The image processing model may alternatively include only two networks (as shown in FIG. 1b), or only one network (as shown in FIG. 1c); or may include more networks, such as four networks or 10 networks.

Figure 2:
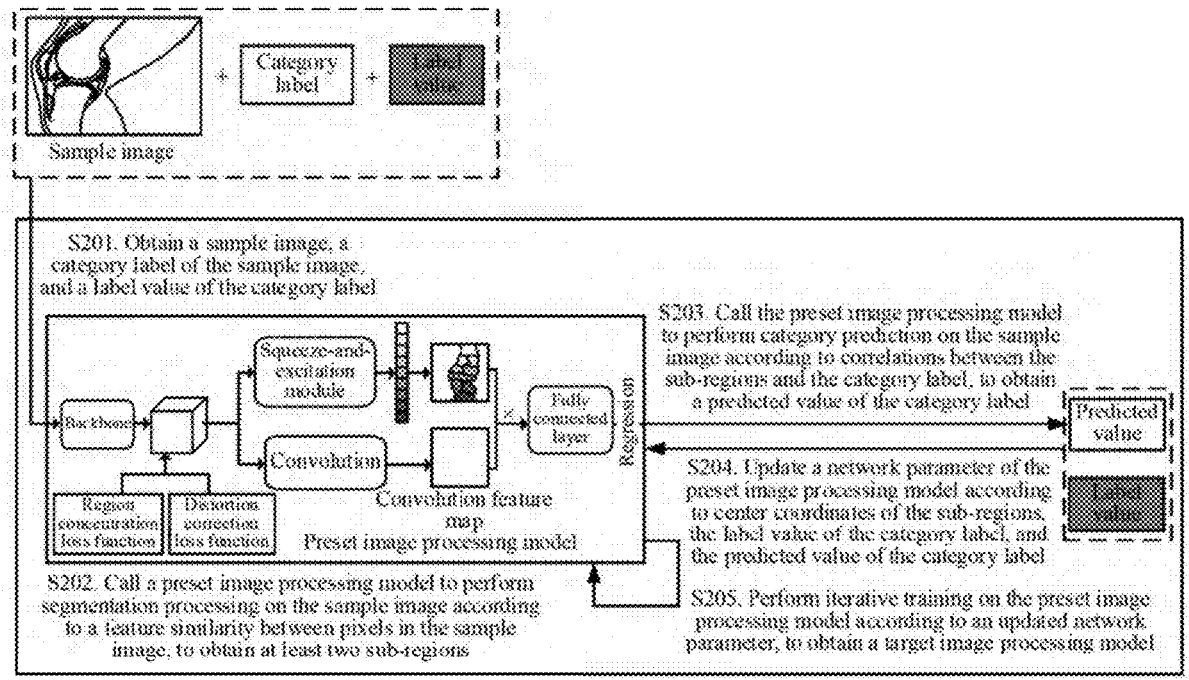
FIG. 2 is a schematic flowchart of an image processing method according to an embodiment of this application.

Based on the foregoing model structure of the image processing model, a preset image processing model may be pre-constructed in this embodiment of this application. In addition, for the preset image processing model, this embodiment of this application provides an image processing method shown in FIG. 2 to better train and update the preset image processing model, so that the accuracy of a target image processing model obtained through training is higher. The image processing method may be performed by a terminal. The terminal herein may include, but is not limited to: a tablet computer, a laptop computer, a notebook computer, a desktop computer, or the like. Referring to FIG. 2, the image processing method may include the following steps S201 to S205:

In step S201, a sample image, a category label of the sample image, and a label value of the category label are obtained, the label value indicating whether the sample image includes an abnormal feature indicated by the category label.

The sample image is an image used to train the preset image processing model. The sample image may include any one of the following images: a medical image including a human body part, a vehicle image including a faulty vehicle, a machine device image including a machine component, or the like, where the human body part may include any one of the following: a knee, a foot, a hand, a neck, a head, a waist, and the like. In an actual training process, a corresponding sample image may be selected according to category prediction performance of a preset image processing model to be trained. For example, when the category prediction performance of the preset image processing model to be trained is performance of disease classification on the medical image, the sample image is the medical image including the human body part; in another example, when the category prediction performance of the preset image processing model to be trained is performance of fault classification on the vehicle image, the sample image is the vehicle image including the faulty vehicle; in still another example, when the category prediction performance of the preset image processing model to be trained is performance of fault classification on the machine device image, the sample image is the machine device image including the machine component, or the like. The foregoing sample image may be a 3D image or a 2D image, where the 3D image is an image formed by pixels with three spatial axes (that is, an X axis, a Y axis, and a Z axis), that is, coordinates of the pixels in the 3D image are three-dimensional coordinates; and the 2D image is an image formed by pixels with two spatial axes (that is, the X axis and the Y axis), that is, coordinates of the pixels in the 2D image are two-dimensional coordinates. For ease of illustration, an example is used for description subsequently in which the sample image is a 3D image.

The category label of the sample image may be set according to image content contained in the sample image and actual service requirements (or service experience), and there may be one or more category labels. For example, when the sample image is a medical image including a knee, common diseases of the knee include: dysplasia, anterior cruciate ligament tear, and meniscus tear. The category label of the sample image may then be set to include at least one of the following labels: a dysplasia label, an anterior cruciate ligament tear label, and a meniscus tear label. The label value of the category label may be set according to whether the sample image includes the abnormal feature indicated by the category label. If the sample image includes the abnormal feature indicated by the category label, the label value of the category label may be set to 1; and if the sample image does not include the abnormal feature indicated by the category label, the label value of the category label may be set to 0. If the sample image is any medical image including a human body part, and the preset image processing model is a model for performing disease category prediction on the medical image of the human body part, the abnormal feature may include a disease feature of the human body part (such as a meniscus disease feature or a dysplasia disease feature); if the sample image is a vehicle image, the abnormal feature may include a fault feature of the faulty vehicle; and if the sample image is a machine device image, the abnormal feature may include a fault feature of a machine component.

In step S202, a preset image processing model is called to perform segmentation processing on the sample image according to a feature similarity between pixels in the sample image, to obtain at least two sub-regions.

As described above, the sample image (such as the medical image or the vehicle image) is a position or structure related image, usually including more complex image content. Studies show that, for the entire sample image, the abnormal feature (such as the disease feature or the fault feature) indicated by the category label is usually densely concentrated in one or more regions, and the category label is more sensitive to a corresponding region. An example is used in which the sample image is a medical image including a knee. The knee is usually composed of a variety of soft tissues and bony tissues, and has a complex structure. In the medical image including the knee (for example, a knee magnetic resonance imaging (MRI) image), the anterior cruciate ligament is adjacent to the meniscus. In addition, disease features indicated by three disease labels of the knee (the dysplasia label, the anterior cruciate ligament tear label, and the meniscus tear label) are mostly concentrated at a cartilage junction. Moreover, the category label is more sensitive to a loss position, for example, the meniscus tear label is only related to a position of the meniscus. In the entire knee MRI image, the disease features are dense and overlap with each other. It is usually necessary to carefully observe an affected part (a corresponding region) to determine the category.

Therefore, in consideration of the denseness of the abnormal features and the sensitivity of the category label to regions, a method for sub-region segmentation of the sample image is used in this embodiment of this application to refine a structure of the image content (for example, the knee) contained in the sample image, to subsequently better perform category prediction on the sample image according to structures (that is, sub-regions). Proved by practice, in the process of performing sub-region segmentation on the sample image, pixels of the same distribution may be clustered into the same sub-region. The same distribution means that positions of the pixels are close and feature values are close, that is, a position difference and a feature value difference between the pixels are both smaller than thresholds. Therefore, the preset image processing model may be called to perform segmentation processing on the sample image according to the feature similarity between the pixels in the sample image, to obtain at least two sub-regions.

In step S203, the preset image processing model is called to perform category prediction on the sample image according to correlations between the sub-regions and the category label, to obtain a predicted value of the category label.

As described above, a relationship between the category label and the corresponding sub-region is usually closer. For example, when the category label is the meniscus tear label, a relationship between the category label and a sub-region including the meniscus in the sample image is usually closer. Therefore, after obtaining a plurality of sub-regions through segmentation, the preset image processing model may be called to analyze the correlations between the sub-regions and the category label. If a correlation between a sub-region and the category label is larger, it indicates that a relationship between the sub-region and the category label is closer. Then, the preset image processing model may be called to perform category prediction on the sample image according to correlations between the sub-regions and the category label, to obtain a predicted value of the category label, the predicted value being used for indicating a probability that the sample image includes the abnormal feature indicated by the category label, and the predicted value being within a range of [0, 1].

In steps S202 and S203, if the preset image processing model includes a plurality of networks, the networks may be respectively called to perform steps S202 and S203. An example is used in which the preset image processing model includes three networks, that is, the preset image processing model may sequentially include a first network, a second network, and a third network. The first network may be configured to perform segmentation processing on the sample image according to the feature similarity between the pixels in the sample image, to obtain at least two sub-regions, that is, the first network may be called to perform step S202; and the second network and the third network may be configured to perform category prediction on the sample image according to the correlations between the sub-regions and the category label, to obtain the predicted value of the category label, that is, the second network and the third network may be called to perform step S203.

In step S204, a network parameter of the preset image processing model is updated according to center coordinates of the sub-regions, the label value of the category label, and the predicted value of the category label.

In a specific implementation process, a loss function of the preset image processing model may be obtained, and a value of the loss function of the preset image processing model may be calculated according to the center coordinates of the sub-regions, the label value of the category label, and the predicted value of the category label. Then, the network parameter of the preset image processing model may be updated in a direction of reducing the value of the loss function. The network parameter of the preset image processing model may include, but not limited to: a gradient parameter, a weight parameter, or the like.

In step S205, iterative training is performed on the preset image processing model according to the updated network parameter, to obtain a target image processing model.

In a specific implementation process, after the network parameter of the preset image processing model is updated, an updated network parameter may be used as a current network parameter of the preset image processing model. Then, steps S201 to S204 are performed again to update the current network parameter (that is, the updated network parameter obtained from the previous training) of the preset image processing model, and so on. Steps S201 to S205 are repeatedly iterated to make the preset image processing model converge, thereby obtaining the target image processing model. The convergence of the preset image processing model means that the network parameter of the preset image processing model no longer changes or has a change amplitude less than a threshold, or that the value of the loss function of the preset image processing model no longer decreases.

For example, an initial network parameter of the preset image processing model is A1, and steps S201 to S204 may be performed for the first time to update the initial network parameter A1 of the preset image processing model to A2. A2 may then be used as the current network parameter of the preset image processing model through step S205, and the preset image processing model may be trained for the second time, that is, steps S201 to S204 may be performed again to update the current network parameter A2 of the preset image processing model to A3. A3 may then be used as the current network parameter of the preset image processing model through step S205, and the preset image processing model may be trained for the third time, that is, steps S201 to S204 may be performed again to update the current network parameter A3 of the preset image processing model to A4, and so on. The preset image processing model is continuously trained to make the preset image processing model converge, and the converging preset image processing model is used as the target image processing model.

In the process of performing image processing on the preset image processing model in this embodiment of this application, the preset image processing model may be called first to perform segmentation processing on the sample image according to a feature similarity between pixels in the sample image, to obtain at least two sub-regions. There is no need to segment and annotate the sub-regions in the sample image in advance, which can save annotation resources and improve segmentation efficiency. The preset image processing model may then be called to perform category prediction on the sample image according to correlations between the sub-regions and the category label, to obtain a predicted value of the category label. The category prediction is implemented by analyzing the correlations between the sub-regions and category label, to further improve classification performance while segmenting the sub-regions, thereby improving the accuracy of category prediction to make the predicted value of the category label more accurate. Then, the network parameter of the preset image processing model may be updated according to the center coordinates of the sub-regions, the label value, and the more accurate predicted value, and iterative training may be performed on the preset image processing model according to the updated network parameter to obtain the target image processing model, thereby improving the accuracy of the target image processing model.

Figure 3:
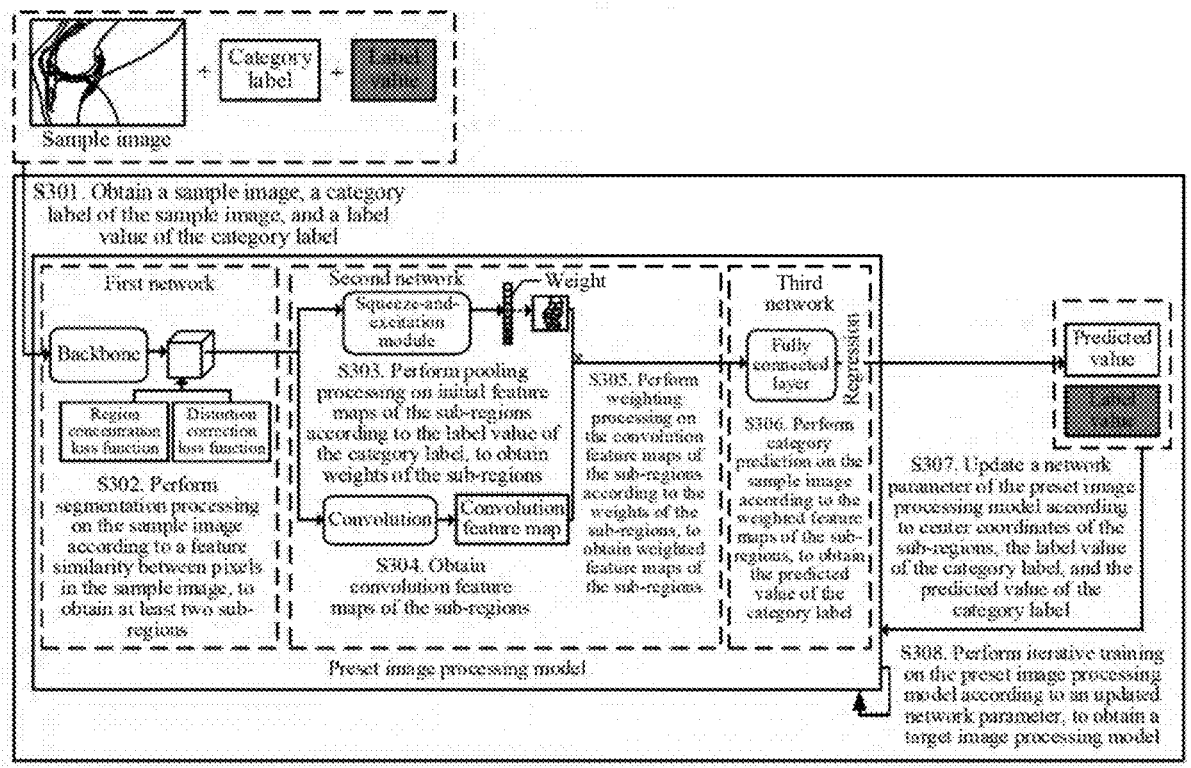
FIG. 3 is a schematic flowchart of another image processing method according to an embodiment of this application.

Based on the foregoing description, an embodiment of this application further provides another image processing method, and the image processing method may be performed by the foregoing terminal. In this embodiment of this application, an example is used for description in which the preset image processing model includes a first network, a second network, and a third network. Referring to FIG. 3, the image processing method may include the following steps S301 to S308.

In step S301, a sample image, a category label of the sample image, and a label value of the category label are obtained, the label value being used for indicating whether the sample image includes an abnormal feature indicated by the category label.

In step S302, a first network is called to perform segmentation processing on the sample image according to a feature similarity between pixels in the sample image, to obtain at least two sub-regions.

In a specific implementation process, the first network may be called first to perform feature extraction on the sample image to obtain initial feature values of the pixels in the sample image. In an implementation, the Backbone in the first network may be directly called to perform feature extraction on the sample image, to obtain the initial feature values of the pixels in the sample image. In an implementation, that one sample image is used to train and update the preset image processing model is only exemplarily illustrated in this embodiment of this application. However, in an actual training process, a plurality of sample images are used to iteratively train and update the preset image processing model. Considering that sizes of all sample images in the x, y, and z directions may be different, to better train and update the model subsequently, the sizes of the sample images may be adjusted to a uniform preset size (for example, 256*256*64), and then the Backbone in the first network is called to perform feature extraction on the sample image after the size adjustment, to obtain the initial feature values of the pixels in the sample image.

The first network may then be called to cluster the pixels in the sample image according to a feature similarity between the initial feature values of the pixels in the sample image to segment the sample image, to obtain at least two sub-regions, pixels in the same sub-region belonging to the same feature distribution. Each sub-region corresponds to an initial feature map. The initial feature map is a feature map obtained by convolving the sample image and a filter. Each initial feature map includes initial feature values of pixels in a corresponding sub-region.

In step S303, the second network is called to perform pooling processing on initial feature maps of the sub-regions according to the label value of the category label, to obtain weights of the sub-regions.

The pooling processing herein may include global average pooling processing, maximum pooling processing, global root-mean-square pooling processing, and the like. The global average pooling processing refers to processing of summing and averaging the feature values of all pixels in the sub-regions. The maximum pooling processing refers to processing of selecting a largest feature value among the feature values of all pixels in the sub-regions; and the global root-mean-square pooling processing refers to processing of performing root-mean-square calculation on the feature values of all pixels in the sub-regions. For ease of illustration, the global average pooling processing is used as an example for description subsequently.

As described above, the second network may include the SE block. Therefore, the SE block in the second network may be called to perform global average pooling processing on initial feature maps of the sub-regions according to the label value of the category label, to obtain a vector of a dimension K. K is a preset quantity of sub-regions, and a value of K may be set according to an empirical value, for example, K=9. A $k^{th}$ element in the K-dimensional vector is a weight of a $k^{th}$ sub-region. The weight of the sub-region is used to reflect a correlation between the sub-region and the category label, and the weight is directly proportional to the correlation, that is, a larger weight indicates a larger correlation. As can be seen, in this embodiment of this application, the association between the category label and the sub-regions is analyzed, and the correlations between the category label and the sub-regions are quantified. In addition, the category label is closely related to sub-regions where abnormal features are gathered, and the weights of the sub-regions are guided by the category supervision information (that is, the category label and the label value of the category label), which can further strengthen the relationship between the category label and the corresponding sub-regions, thereby further improving the classification performance and the accuracy of category prediction subsequently.

In step S304, the second network is called to obtain convolution feature maps of the sub-regions.

As described above, the second network includes the convolution layer. Therefore, in a specific implementation process, the convolution layer of the second network may be called to perform convolution processing on the pixel features of the sub-regions, to obtain the convolution feature maps of the sub-regions. A convolution feature map of each sub-region includes convolution feature values of pixels in the sub-region.

In step S305, the second network is called to perform weighting processing on the convolution feature maps of the sub-regions according to the weights of the sub-regions, to obtain weighted feature maps of the sub-regions.

Because the principle of calling the second network to obtain the weighted feature maps of the sub-regions is the same, a reference sub-region in at least two sub-regions is used as an example for illustration in this embodiment of this application. That is, the reference sub-region is included in the at least two sub-regions, and the reference sub-region is one of the at least two sub-regions. In an implementation, the second network may be directly called to perform weighting processing on a convolution feature map of the reference sub-region according to a weight of the reference sub-region, to obtain a weighted feature map of the reference sub-region. Specifically, for any pixel in the reference sub-region, the second network is called to calculate a product of a convolution feature value of the pixel in the convolution feature map and the weight of the reference sub-region, to obtain a weighted feature value of the pixel. This step is iterated to calculate weighted feature values of all pixels in the reference sub-region, to obtain the weighted feature map of the reference sub-region. The weighted feature map includes the weighted feature values of the pixels in the reference sub-region.

When segmentation processing is performed on the sample image in step S302, there may be a segmentation error, that is, pixels not belonging to the reference sub-region may be assigned to the reference sub-region. In addition, as described above, the weighting processing performed on the convolution feature map of the reference sub-region uses the weight of the reference sub-region to enlarge the convolution feature values of the pixels in the reference sub-region, so that features of the pixels are more obvious. As can be seen, in this case, if weighting processing is performed on the convolution feature map of the reference sub-region directly according to the weight of the reference sub-region, convolution feature values of the pixels not belonging to the reference sub-region are also enlarged. Consequently, when performing feature learning on the reference sub-region subsequently, the third network erroneously fits features (that is, non-key features) of the pixels not belonging to the reference sub-region, which further leads to lower accuracy of subsequent category prediction. Therefore, to prevent the third network from erroneously fitting the non-key features in the reference sub-region subsequently, this embodiment of this application further provides another implementation for step S305, and the implementation may specifically include the following steps s11 and s12.

In step s11, a weight distribution map of the reference sub-region is determined according to a weight of the reference sub-region and initial feature values of pixels in the reference sub-region.

In a specific implementation process, normalization processing may be first performed on the pixels in the reference sub-region to obtain probability values that the pixels in the reference sub-region belong to the reference sub-region. Binarization processing is then performed on the initial feature values of the pixels in the reference sub-region according to the probability values of the pixels in the reference sub-region and a probability threshold, to obtain a mask of the reference sub-region. The mask is a binary image composed of 0 and 1, and the mask includes feature values of the pixels in the reference sub-region after the binarization processing. Then, a product of the weight of the reference sub-region and the mask is calculated to obtain the weight distribution map of the reference sub-region. The weight distribution map includes weights of the pixels in the reference sub-region. A weight of each pixel is equal to a product of the weight of the reference sub-region and a feature value of the pixel in the mask after the binarization processing. For example, the weight of the reference sub-region is 7. If a feature value of a pixel a in the reference sub-region after the binarization processing is 1, a weight of the pixel a is 7×1=7; and if a feature value of a pixel b in the reference sub-region after the binarization processing is 0, a weight of the pixel b is 7×0=0.

Figure 4:
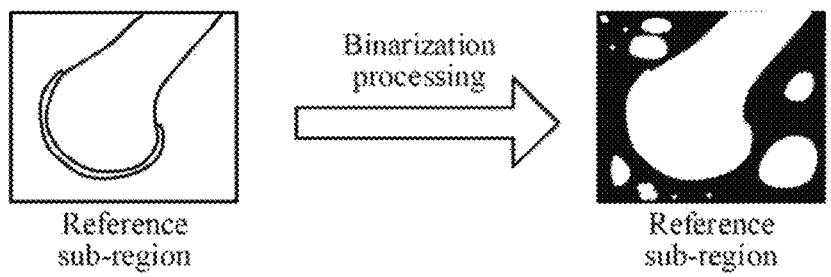
FIG. 4 is a schematic diagram of binarization processing according to an embodiment of this application.

When binarization processing is performed on the initial feature values of the pixels in the reference sub-region according to the probability values of the pixels in the reference sub-region and a probability threshold, whether the probability values of the pixels in the reference sub-region are greater than the probability threshold may be determined. If a probability value of a pixel is greater than the probability threshold, it indicates that the pixel belongs to the reference sub-region, and an initial feature value of the pixel may be set to 1; and if a probability value of a pixel is less than the probability threshold, it indicates that the pixel does not belong to the reference sub-region. Then, to prevent the third network from erroneously fitting a feature of the pixel when performing feature learning on the reference sub-region subsequently, the initial feature value of the pixel may be set to 0. In other words, the binarization processing refers to processing of setting an initial feature value of a pixel with a probability value greater than the probability threshold in the reference sub-region to 1, and setting an initial feature value of a pixel with a probability value less than the probability threshold in the reference sub-region to 0. Correspondingly, a schematic diagram of the binarization processing is shown in FIG. 4. The probability threshold may be set according to actual service requirements or an empirical value. For example, the probability threshold may be set to 0.5.

In step s12, weighting processing is performed on a convolution feature map of the reference sub-region by using the weight distribution map of the reference sub-region, to obtain a weighted feature map of the reference sub-region.

As described above, the weight distribution map of the reference sub-region includes the weights of the pixels in the reference sub-region, and the convolution feature map of the reference sub-region includes the convolution feature values of the pixels in the reference sub-region. Then, when the weight distribution map of the reference sub-region is used to perform weighting processing on the convolution feature map of the reference sub-region, for any pixel in the reference sub-region, a product of a weight of the pixel and a convolution feature value of the pixel may be calculated, to obtain a weighted feature value of the pixel. This step is iterated to calculate weighted feature values of all pixels in the reference sub-region, to obtain the weighted feature map of the reference sub-region. The weighted feature map includes the weighted feature values of the pixels in the reference sub-region.

In step S306, the third network is called to perform category prediction on the sample image according to the weighted feature maps of the sub-regions, to obtain the predicted value of the category label.

Specifically, the third network may be called to perform feature learning on the weighted feature maps of the sub-regions, and then perform category prediction on the sample image according to learned features of the sub-regions, to obtain the predicted value of the category label.

In step S307, a network parameter of the preset image processing model is updated according to center coordinates of the sub-regions, the label value of the category label, and the predicted value of the category label.

As described above, the preset image processing model in this embodiment of this application includes such three networks as the first network, the second network, and the third network. Therefore, a network parameter of each network in the preset image processing model may be updated according to center coordinates of the sub-regions, the label value of the category label, and the predicted value of the category label. Correspondingly, a specific implementation of step S307 may include the following steps s21 and s22.

In step s21, a network parameter of the first network is updated according to the center coordinates of the sub-regions and coordinates of the pixels in the sample image.

Before step s21 is performed, the center coordinates of the sub-regions may be calculated. Because the sample image is a 3D image, center coordinates of each sub-region may include center coordinates in three directions: center coordinates in the X direction, center coordinates in the y direction, and center coordinates in the Z direction. When center coordinates of any sub-region are calculated, center coordinates of the sub-region in each direction may be calculated. Because center coordinates of each sub-region in each direction are calculated in the same manner, calculation of center coordinates of a $(k)^{th}$ sub-region in an x direction is used as an example for description in this application. A specific calculation formula thereof is shown in formula 1.1:

$$c_x^k = \Sigma_{x,y,z}(x \cdot F(k,x,y,z)/l^k) \qquad \text{Formula 1.1}$$

In formula 1.1, $c_x^k$ represents the center coordinates of the $(k)^{th}$ sub-region in the X direction. $F(k,x,y,z)$ represents feature values of an initial feature map of the $(k)^{th}$ a sub-region at $\langle x,y,z \rangle$ extracted by the first network, where $\langle x,y,z \rangle$ are coordinates of a pixel, that is, $F(k,x,y,z)$ represents initial feature values of pixels in the $(k)^{th}$ sub-region extracted by the first network; and $l^k$ is a normalization term used to convert the feature values of the initial feature map of the $(k)^{th}$ sub-region at $\langle x,y,z \rangle$ into weights, and a specific calculation formula thereof is shown in formula 1.2:

$$l^k = \Sigma_{x,y,z} F(k,x,y,z) \qquad \text{Formula 1.2}$$

After the center coordinates of the sub-regions are calculated by using the foregoing method, a network parameter of the first network may be updated according to the center coordinates of the sub-regions and coordinates of the pixels in the sample image. In a specific implementation process, a loss function of the first network may be obtained first. A value of the loss function may be then calculated according to the center coordinates of the sub-regions and the coordinates of the pixels in the sample image. Then, the network parameter of the first network may be updated in a direction of reducing the value of the loss function.

In an implementation, the loss function of the first network may include a region concentration loss function. The region concentration loss function is used in the process of performing segmentation processing on the image, so that features of surrounding pixels are more similar to center features of the closest region, to cluster pixels with the same distribution into the same sub-region, so as to achieve a region segmentation effect. A specific formula of the region concentration loss function is shown in the following formula 1.3, where $\lambda_{RC}$ is a loss weight, and a specific value thereof may be set according to an empirical value:

$$L_{RC} = \lambda_{RC} \sum_{k=1}^{K} \sum_{x,y,z} \| \langle x, y, z \rangle - \langle c_x^k, c_y^k, c_z^k \rangle \|^2 \cdot \qquad \text{Formula 1.3}$$
$$F(k, x, y, z)/l^k$$

In this implementation, when the value of the loss function is calculated according to the center coordinates of the sub-regions and the coordinates of the pixels in the sample image, a loss value of the region concentration loss function may be calculated according to the initial feature values of the pixels in the sample image, the coordinates of the pixels in the sample image, and the center coordinates of the sub-regions; and then the loss value of the region concentration loss function may be used as the value of the loss function of the first network.

In an implementation, in deep learning, the Backbone (CNN network) does not have much tolerance for distortions of an image such as rotation, translation, and warping. As a result, when the image undergoes a distortion such as rotation, translation, or warping, features extracted by the Backbone change accordingly. However, practice shows that pixel features of an image are not to change as the image is distorted. For example, for an image including a dog, after the image is rotated by 90° the image content contained in the image is still a dog, and features of the dog do not change. Therefore, to strengthen the tolerance of the first network for the foregoing image distortions and avoid a deviation of image segmentation and category prediction caused by the image distortions, this embodiment of this application further introduces a distortion correction loss function for the loss function of the first network. The distortion correction loss function can strengthen the tolerance of the first network for a distorted image, thereby ensuring that for the same image content, features extracted from the image with distortions (referred to as the distorted image) are consistent with those extracted from the original image. Specifically, a specific formula of the distortion correction loss function is shown in the following formula 1.4, where the first term of the formula $L_{DC}$ is used to ensure that feature distributions of the distorted image and the original image are consistent; the second term of the formula $L_{DC}$ is used to ensure that sub-region center features of the distorted image and the original image are similar; and the consistency of the two items may strengthen the tolerance of the first network for image distortions.

$$L_{DC} = \lambda_{DC}^{f'} E_{KL}(T_{DC}(F) \mid F') +$$

$$\lambda_{DC}^{f''} \sum_{k=1}^{K} \left\| T_{DC}(\langle c_x^k, c_y^k, c_z^k \rangle) - \langle c_x^{k'}, c_y^{k'}, c_z^{k'} \rangle \right\|^2 \quad \text{Formula 1.4}$$

where F are initial feature maps outputted by the original image (for example, a sample image) through the Backbone, that is, F include initial feature maps of K sub-regions; $T_{DC}$ is a distortion processing parameter, and the distortion processing includes at least one of the following processing: angle rotation (for example, random angle rotation from −10° to 10° is performed on the sample image), pixel translation (for example, one or more pixels in the sample image are translated by 20 pixel units in any direction), image scaling (for example, random scaling from 1.2 times to 0.9 times is performed on the sample image), and chamfer changing. The chamfer changing refers to changing a shape of the sample image (for example, changing a rectangular sample image into a parallelogram-shaped sample image). F' is obtained after F undergoes the distortion processing (that is, an initial feature map outputted, through the Backbone, by an image obtained after the distortion processing), and $(T_{DC}(F)|F')$ is a conditional probability; $E_{KL}$ is a Kullback-Leibler divergence (KL divergence) calculation formula, $E_{KL}$ represents a distribution similarity between the two initial feature maps (that is, F and F'), $\langle c_x^{k'}, c_y^{k'}, c_z^{k'} \rangle$ represents center coordinates of the $(k)^{th}$ sub-region in F'; and both $\lambda_{DC}^{f}$ and $\lambda_{DC}^{f'}$ are weights preset according to empirical values.

Figure 5:
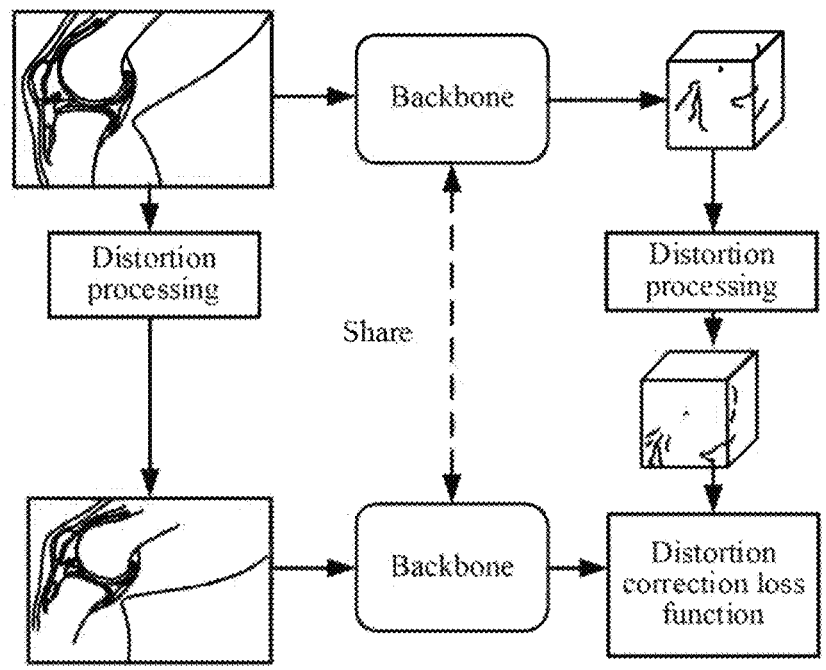
FIG. 5 is a schematic diagram of distortion processing according to an embodiment of this application.

In a case that the loss function of the first network includes the region concentration loss function and the distortion correction loss function, when the value of the loss function is calculated according to the center coordinates of the sub-regions and the coordinates of the pixels in the sample image, a loss value of the region concentration loss function may be calculated first according to the initial feature values of the pixels in the sample image, the coordinates of the pixels in the sample image, and the center coordinates of the sub-regions. Distortion processing is performed on the sample image, and a loss value of the distortion correction loss function is calculated according to an image obtained after the distortion processing and the sample image. Specifically, the image obtained after the distortion processing may be segmented into at least two sub-regions (that is, K sub-regions), the center coordinates $\langle c_x^{k'}, c_y^{k'}, c_z^{k'} \rangle$ of the $(k)^{th}$ sub-region are calculated according to coordinates of pixels in the image obtained after the distortion processing, and $\langle c_x^{k'}, c_y^{k'}, c_z^{k'} \rangle$ and $\langle c_x^{k'}, c_y^{k'}, c_z^{k'} \rangle$ are substituted into the foregoing formula 1.4 to obtain the loss value of the distortion correction loss function, where a schematic diagram of the distortion processing is shown in FIG. 5. A sum of the loss value of the region concentration loss function and the loss value of the distortion correction loss function is then calculated to obtain the value of the loss function.

In step s22, a network parameter of the second network and a network parameter of the third network are updated according to a difference between the label value of the category label and the predicted value of the category label.

In a specific implementation process, the difference between the label value of the category label and the predicted value of the category label may be determined first; and then the network parameter of the second network and the network parameter of the third network are updated in a direction of reducing the difference. The difference between the label value of the category label and the predicted value of the category label may be represented by a loss value of a cross-entropy loss function. A smaller loss value of the cross-entropy loss function indicates a smaller difference between the label value of the category label and the predicted value of the category label. Correspondingly, in the process of determining the difference between the label value of the category label and the predicted value of the category label, a cross-entropy loss function related to the second network and the third network may be obtained first; and then the loss value of the cross-entropy loss function is calculated according to the label value of the category label and the predicted value of the category label.

If the image content contained in the sample image has multi-directional imaging maps, an imaging map of each direction may be used as the sample image and the foregoing steps S301 to S306 are performed, to obtain a predicted value of a category label of the imaging map of each direction. Then, for each category label, a multi-directional image fusion strategy may be used to perform fusion processing on a plurality of predicted values of the category label to obtain a final predicted value of the category label. In this case, the predicted value of the category label used in step S307 refers to the final predicted value of the category label after the fusion processing. The multi-directional image fusion strategy includes: for each category label, a largest predicted value is selected from predicted values corresponding to the multi-directional imaging map as the final predicted value of the category label; or the final predicted value of the category label is determined from the predicted values corresponding to the multi-directional imaging map based on a voting principle, or the like.

In step S308, iterative training is performed on the preset image processing model according to an updated network parameter, to obtain a target image processing model.

As described above, in the foregoing steps S302 to S308, the networks in the preset image processing model may be controlled to learn toward specified purposes. For example, the first network is controlled to learn toward a purpose of accurately performing segmentation processing on the image, the second network is controlled to learn toward a purpose of accurately obtaining the weighted feature maps of the sub-regions, and the third network is controlled to learn toward a purpose of accurately performing category prediction. In the related black-box training method, a processing process inside a model cannot be learned. By contrast, in this embodiment of this application, the networks in the preset image processing model are controlled to learn toward specified purposes, to implement a white-box training manner and strengthen the robustness of the preset image processing model.

In the process of performing image processing on the preset image processing model in this embodiment of this application, the preset image processing model may be called first to perform segmentation processing on the sample image according to a feature similarity between pixels in the sample image, to obtain at least two sub-regions. There is no need to segment and annotate the sub-regions in the sample image in advance, which can save annotation resources and improve segmentation efficiency. The preset image processing model may then be called to perform category prediction on the sample image according to correlations between the sub-regions and the category label, to obtain a predicted value of the category label. The category prediction is implemented by analyzing the correlations between the sub-regions and category label, to further improve classification performance while segmenting the sub-regions, thereby improving the accuracy of category prediction to make the predicted value of the category label more accurate. Then, the network parameter of the preset image processing model may be updated according to the center coordinates of the sub-regions, the label value, and the more accurate predicted value, and iterative training may be performed on the preset image processing model according to the updated network parameter to obtain the target image processing model, thereby improving the accuracy of the target image processing model.

Figure 6:
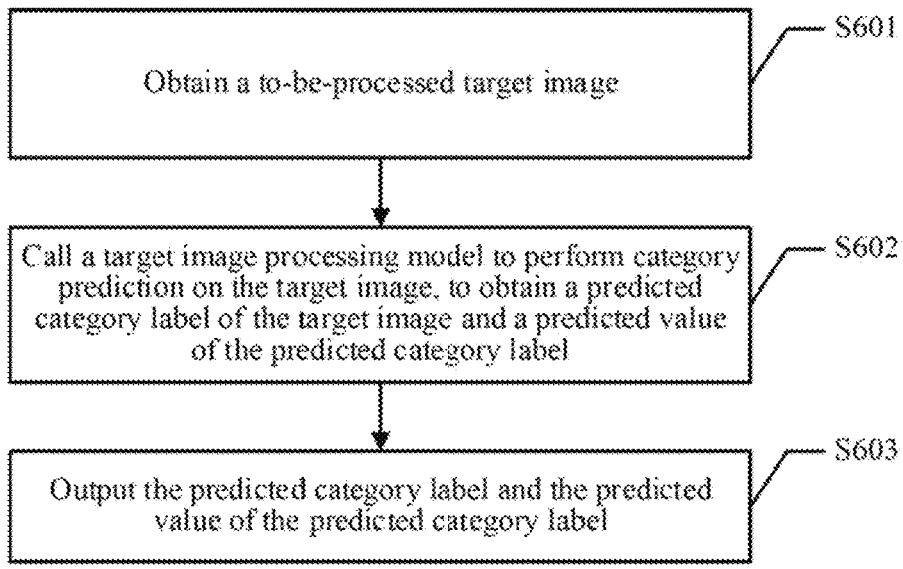
FIG. 6 is a schematic flowchart of an image processing method according to an embodiment of this application.

Based on the foregoing description, for the target image processing model obtained by training the preset image processing model by using the foregoing image processing method, an embodiment of this application further provides an image processing method shown in FIG. 6. The image processing method may be performed by the foregoing terminal. As shown in FIG. 6, the image processing method may include the following steps S601 to S603:

In step S601, a to-be-processed target image is obtained.

The terminal may detect, in real time or periodically, whether there is a trigger event of image processing; and after a trigger event of image processing is detected, the terminal may obtain the to-be-processed target image in response to the trigger event. The trigger event of image processing may include any one of the following: an event in which a user uploads a target image, an event in which a user uploads a target image and performs a confirmation operation (for example, an event in which the target image is uploaded and a confirmation button in a terminal interface is clicked), and the like.

The target image herein may be a 3D image or a 2D image. The target image may include any one of the following images: a medical image including a human body part, a vehicle image including a faulty vehicle, a machine device image including a machine component, or the like, where the human body part may include any one of the following: a knee, a foot, a hand, a neck, a head, a waist, and the like.

In step S602, a target image processing model is called to perform category prediction on the target image, to obtain a predicted category label of the target image and a predicted value of the predicted category label.

The target image processing model is obtained by training a preset image processing model by using the image processing method shown in FIG. 2 or FIG. 3, and the predicted value indicates a probability that the target image includes an abnormal feature indicated by the predicted category label. There may be one or more predicted category labels of the target image, and a quantity of predicted category labels is the same as a quantity of types of abnormal features included in the target image. For example, if the target image includes two types of abnormal features, there are two predicted category labels of the target image. In another example, if the target image includes one type of abnormal feature, there is one predicted category label of the target image, and so on.

In a specific implementation process, the target image processing model may be called first to perform segmentation processing on the target image according to the feature similarity between pixels in the target image, to obtain at least two sub-regions and initial feature maps of the sub-regions. The target image processing model is then called to perform pooling processing on the initial feature maps of the sub-regions to obtain weights of the sub-regions, obtain convolution feature maps of the sub-regions, and perform weighting processing on the convolution feature maps of the sub-regions according to the weights of the sub-regions, to obtain weighted feature maps of the sub-regions. Then, a target image processing model is called to perform category prediction on the target image according to the weighted feature maps of the sub-regions, to obtain a predicted category label of the target image and a predicted value of the predicted category label.

In step S603, the predicted category label and the predicted value of the predicted category label are output.

After the predicted category label of the target image and the predicted value of the predicted category label are obtained, the predicted category label and the predicted value of the predicted category label may be outputted. In an implementation, if an image viewing instruction for category prediction is detected, intermediate images may be outputted, so that the user may determine an approximate processing process of the target image processing model according to the intermediate images, where the intermediate images include at least one of the following images: the initial feature maps of the sub-regions, the convolution feature maps of the sub-regions, the weighted feature maps of the sub-regions, and the like.

During the image processing in this embodiment of this application, a to-be-processed target image may be obtained first, and a target image processing model may be then called to perform category prediction on the target image, to obtain a predicted category label of the target image and a predicted value of the predicted category label. Then, the predicted category label and the predicted value of the predicted category label may be outputted. Because the target image processing model is obtained through training by using the image processing method shown in FIG. 2 or FIG. 3, calling the target image processing model to perform category prediction on the target image can improve the accuracy of category prediction and make the predicted value of the category label more accurate.

As discussed above, the target image processing model provided in this embodiment of this application is suitable for category prediction of any position or structure related target image. An example is used in which the target image is a medical image including a knee (knee MRI image). The foregoing target image processing model may be used to perform automatic aided diagnosis on common diseases in the knee MRI image. Specifically, the target image processing model may be used in the following application scenarios: (1) The target image processing model may be embedded in a terminal device to perform category prediction on any knee MRI image, and may be used in a bone and joint department or an imaging department in any hospital to help a physician diagnose common knee diseases. (2) The target image processing model may be further used as a retrieval engine in a disease retrieval system for knee MRI images, to implement a function of searching for images by diseases or a function of searching for diseases by images of the disease retrieval system. The function of searching for images by diseases refers to a function in which a user inputs a disease label, and the disease retrieval system calls the target image processing model according to the disease label to retrieve and output a knee MRI image corresponding to the disease label; and the function of searching for diseases by images refers to a function that a user inputs the knee MRI image, and the disease retrieval system calls the target image processing model to perform category prediction on the knee MRI image and output a predicted category label (predicted disease label) and a predicted value of the predicted category label. (3) The target image processing model is used to construct a medical knowledge popularization system or a physician training system.

Figure 7A:
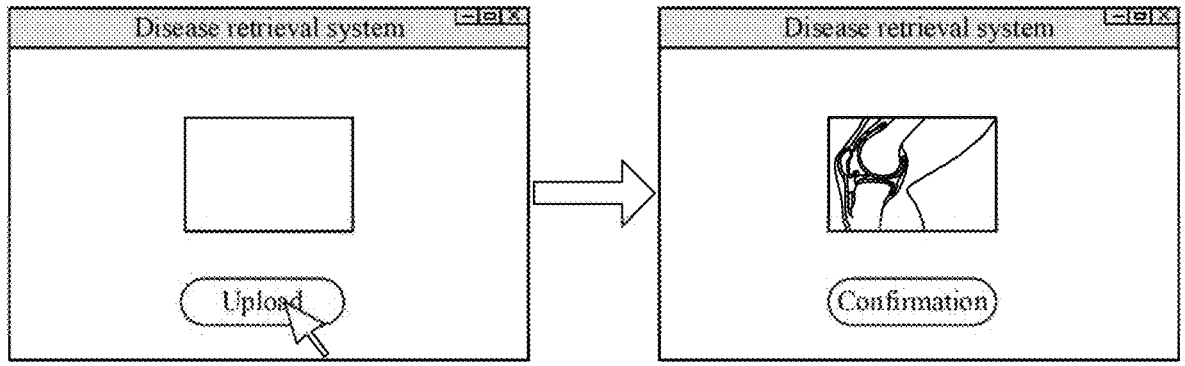
FIG. 7a is a diagram of an application scenario of a target image processing model according to an embodiment of this application.

An example is used below in which the target image processing model is used in the disease retrieval system to implement the function of searching for diseases by images of the disease retrieval system, category prediction is performed on the medical image including a knee (the knee MRI image), and a quantity of predicted category labels is 3. To elaborate on the application scenarios of the target image processing model, the following scenario is given. When the user wants to know whether a knee A has common knee diseases such as dysplasia, anterior cruciate ligament tear, and meniscus tear, the user may open the disease retrieval system, and click an upload button to upload a knee MRI image including at least one knee section (such as a sagittal section, a coronal section, or a cross section) of the knee A and input the knee MRI image into the disease retrieval system, as shown in FIG. 7a. The sagittal section refers to a section made by longitudinally cutting the knee into left and right parts; the coronal section refers to a section made by longitudinally cutting the knee into front and rear parts; and the cross section refers to a section made by transversely cutting the knee into upper and lower parts.

Figure 7B:
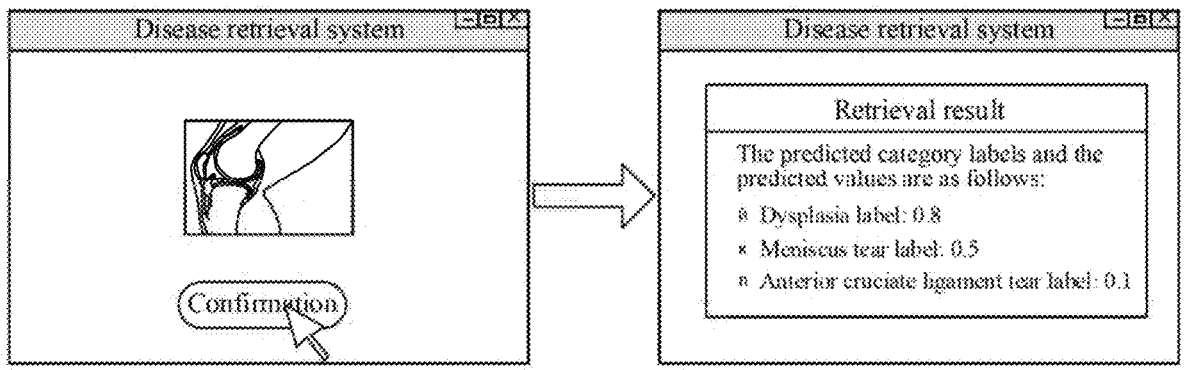
FIG. 7b is a diagram of another application scenario of a target image processing model according to an embodiment of this application.

After the MRI image is uploaded, a confirmation button may be clicked, as shown in FIG. 7b. Correspondingly, the disease retrieval system may obtain the knee MRI image of the at least one knee section. For a knee MRI image of any knee section, the disease retrieval system may call the target image processing model to perform category prediction on the knee MRI image, to obtain predicted values of three predicted category labels of the knee MRI image. The foregoing step is iterated to obtain predicted values of three predicted category labels of a knee MRI image of each knee section. As can be seen, after category prediction is performed on the knee MRI images of the knee sections, each predicted category label has a plurality of predicted values, and a quantity of predicted values of each predicted category label is the same as a quantity of the knee MRI images. For any predicted category label, the target image processing model may further use the multi-directional image fusion strategy to perform fusion processing on a plurality of predicted values of the predicted category label, to obtain a final predicted value of the predicted category label. The disease retrieval system may output the predicted category labels and final predicted values of the predicted category labels (as shown in FIG. 7b), so that the user may determine, according to the predicted category labels, whether the knee A has common knee diseases such as dysplasia, anterior cruciate ligament tear, and meniscus tear.

Figure 8:
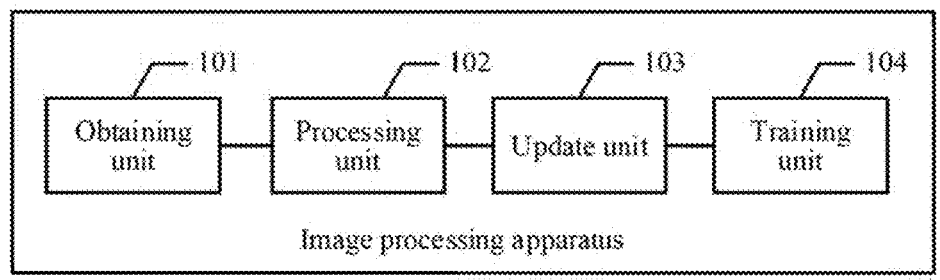

Based on the foregoing description of the embodiments of the image processing method, an embodiment of this application further discloses an image processing apparatus. The image processing apparatus may be a computer program (including program code) run on a terminal. The image processing apparatus may perform the methods shown in FIG. 2 and FIG. 3. Referring to FIG. 8, the image processing apparatus may operate the following units: an obtaining unit 101, configured to obtain a sample image, a category label of the sample image, and a label value of the category label, the label value being used for indicating whether the sample image includes an abnormal feature indicated by the category label. The image processing apparatus may further include processing unit 102, configured to call a preset image processing model to perform segmentation processing on the sample image according to a feature similarity between pixels in the sample image, to obtain at least two sub-regions. The processing unit 102 is configured to call the preset image processing model to perform category prediction on the sample image according to correlations between the sub-regions and the category label, to obtain a predicted value of the category label, the predicted value being used for indicating a probability that the sample image includes the abnormal feature indicated by the category label. The image processing apparatus may further include update unit 103, configured to update a network parameter of the preset image processing model according to center coordinates of the sub-regions, the label value of the category label, and the predicted value of the category label. The image processing apparatus may further include a training unit 104, configured to perform iterative training on the preset image processing model according to an updated network parameter, to obtain a target image processing model. One or more of units can be implemented by processing circuitry, software, or a combination thereof, for example.

In an implementation, the preset image processing model sequentially includes a first network, a second network, and a third network, where the first network is configured to perform segmentation processing on the sample image according to the feature similarity between the pixels in the sample image, to obtain at least two sub-regions; and the second network and the third network are configured to perform category prediction on the sample image according to the correlations between the sub-regions and the category label, to obtain the predicted value of the category label.

In an implementation, the processing unit 102, when being configured to call a preset image processing model to perform segmentation processing on the sample image according to a feature similarity between pixels in the sample image, to obtain at least two sub-regions, is further configured to: call the first network to perform feature extraction on the sample image to obtain initial feature values of the pixels in the sample image; and call the first network to cluster the pixels in the sample image according to a feature similarity between the initial feature values of the pixels in the sample image to segment the sample image, to obtain at least two sub-regions, pixels in the same sub-region belonging to the same feature distribution.

In an implementation, the processing unit 102, when being configured to call the preset image processing model to perform category prediction on the sample image according to correlations between the sub-regions and the category label, to obtain a predicted value of the category label, is further configured to: call the second network to perform pooling processing on initial feature maps of the sub-regions according to the label value of the category label, to obtain weights of the sub-regions, each initial feature map including initial feature values of pixels in a corresponding sub-region, the weights being used for reflecting the correlations between the sub-regions and the category label, and the weights being directly proportional to the correlations. The processing unit 102 is further configured to obtain convolution feature maps of the sub-regions, and perform weighting processing on the convolution feature maps of the sub-regions according to the weights of the sub-regions, to obtain weighted feature maps of the sub-regions, and call the third network to perform category prediction on the sample image according to the weighted feature maps of the sub-regions, to obtain the predicted value of the category label.

In an implementation, the at least two sub-regions include a reference sub-region, and the reference sub-region is any one of the at least two sub-regions; and correspondingly, the processing unit 102, when being configured to perform weighting processing on the convolution feature maps of the sub-regions according to the weights of the sub-regions, to obtain weighted feature maps of the sub-regions, is further configured to: determine a weight distribution map of the reference sub-region according to a weight of the reference sub-region and initial feature values of pixels in the reference sub-region, the weight distribution map including weights of the pixels in the reference sub-region; and perform weighting processing on a convolution feature map of the reference sub-region by using the weight distribution map of the reference sub-region, to obtain a weighted feature map of the reference sub-region.

In an implementation, the processing unit 102, when being configured to determine a weight distribution map of the reference sub-region according to a weight of the reference sub-region and initial feature values of pixels in the reference sub-region, is further configured to: perform normalization processing on the pixels in the reference sub-region to obtain probability values that the pixels in the reference sub-region belong to the reference sub-region; perform binarization processing on the initial feature values of the pixels in the reference sub-region according to the probability values of the pixels in the reference sub-region and a probability threshold, to obtain a mask of the reference sub-region, the mask including feature values of the pixels in the reference sub-region after the binarization processing; and calculate a product of the weight of the reference sub-region and the mask to obtain the weight distribution map of the reference sub-region.

In an implementation, the update unit 103, when being configured to update a network parameter of the preset image processing model according to center coordinates of the sub-regions, the label value of the category label, and the predicted value of the category label, is further configured to: update a network parameter of the first network according to the center coordinates of the sub-regions and coordinates of the pixels in the sample image; and update a network parameter of the second network and a network parameter of the third network according to a difference between the label value of the category label and the predicted value of the category label.

In an implementation, the update unit 103, when being configured to update a network parameter of the first network according to the center coordinates of the sub-regions and coordinates of the pixels in the sample image, is further configured to: obtain a loss function of the first network; calculate a value of the loss function according to the center coordinates of the sub-regions and the coordinates of the pixels in the sample image; and update the network parameter of the first network in a direction of reducing the value of the loss function.

In an implementation, the loss function of the first network includes a region concentration loss function and a distortion correction loss function; and correspondingly, the update unit 103, when being configured to calculate a value of the loss function according to the center coordinates of the sub-regions and the coordinates of the pixels in the sample image, is further configured to: calculate a loss value of the region concentration loss function according to initial feature values of the pixels in the sample image, the coordinates of the pixels in the sample image, and the center coordinates of the sub-regions. The update unit 103 is further configured to perform distortion processing on the sample image, and calculate a loss value of the distortion correction loss function according to an image obtained after the distortion processing and the sample image. The distortion processing includes at least one of the following processing: angle rotation, pixel translation, image scaling, and chamfer changing; and calculate a sum of the loss value of the region concentration loss function and the loss value of the distortion correction loss function to obtain the value of the loss function.

In an implementation, the sample image is any medical image including a human body part, the preset image processing model is a model for performing disease category prediction on the medical image of the human body part, and the abnormal feature includes a disease feature of the human body part, where the human body part may include any one of the following: a knee, a foot, a hand, a neck, a head, and a waist.

According to an embodiment of this application, the steps in the methods shown in FIG. 2 and FIG. 3 may be performed by the units of the image processing apparatus shown in FIG. 8. For example, step S201 shown in FIG. 2 may be performed by the obtaining unit 101 shown in FIG. 8, steps S202 and S203 may be performed by the processing unit 102 shown in FIG. 8, step S204 may be performed by the update unit 103 shown in FIG. 8, and step S205 may be performed by the training unit 104 shown in FIG. 8. In another example, step S301 shown in FIG. 3 may be performed by the obtaining unit 101 shown in FIG. 8, steps S302 to S306 may be performed by the processing unit 102 shown in FIG. 8, step S307 may be performed by the update unit 103 shown in FIG. 8, and step S308 may be performed by the training unit 104 shown in FIG. 8.

According to another embodiment of this application, the units of the image processing apparatus shown in FIG. 8 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the image processing apparatus may also include other units. In an actual application, the functions may also be cooperatively implemented by other units and may be cooperatively implemented by a plurality of units.

According to another embodiment of this application, a computer program (including program code) that can perform the steps in the corresponding methods shown in FIG. 2 and FIG. 3 may be run on a general computing device, such as a computer, which includes processing elements (processing circuitry) and storage elements (non-transitory computer-readable storage medium) such as a central processing unit (CPU), a random access memory (RAM), and a read-only memory (ROM), to construct the image processing apparatus shown in FIG. 8 and implement the image processing method in the embodiments of this application.

The computer program may be recorded on, for example, a computer-readable recording medium, and may be loaded into the foregoing computing device by using the computer-readable recording medium and run on the computing device.

In the process of performing image processing on the preset image processing model in this embodiment of this application, the preset image processing model may be called first to perform segmentation processing on the sample image according to a feature similarity between pixels in the sample image, to obtain at least two sub-regions. There is no need to segment and annotate the sub-regions in the sample image in advance, which can save annotation resources and improve segmentation efficiency. The preset image processing model may then be called to perform category prediction on the sample image according to correlations between the sub-regions and the category label, to obtain a predicted value of the category label. The category prediction is implemented by analyzing the correlations between the sub-regions and category label, to further improve classification performance while segmenting the sub-regions, thereby improving the accuracy of category prediction to make the predicted value of the category label more accurate. Then, the network parameter of the preset image processing model may be updated according to the center coordinates of the sub-regions, the label value, and the more accurate predicted value, and iterative training may be performed on the preset image processing model according to the updated network parameter to obtain the target image processing model, thereby improving the accuracy of the target image processing model.

Based on the foregoing description of the embodiments of the image processing method, an embodiment of this application further discloses an image processing apparatus. The image processing apparatus may be a computer program (including program code) run on a terminal. The image processing apparatus may perform the method shown in FIG. 6. Referring to FIG. 9, the image processing apparatus may operate the following units: an obtaining unit 201, configured to obtain a to-be-processed target image. The image processing apparatus may further include a processing unit 202, configured to call a target image processing model to perform category prediction on the target image, to obtain a predicted category label of the target image and a predicted value of the predicted category label, the target image processing model being obtained by processing a preset image processing model by using the image processing method shown in FIG. 2 or FIG. 3, and the predicted value being used for indicating a probability that the target image includes an abnormal feature indicated by the predicted category label. The image processing apparatus may further include an output unit 203, configured to output the predicted category label and the predicted value of the predicted category label. One or more of the units can be implemented by processing circuitry, software, or a combination thereof, for example.

According to an embodiment of this application, the steps in the method shown in FIG. 6 may be performed by the units of the image processing apparatus shown in FIG. 9. Specifically, steps S601 to S603 shown in FIG. 6 may be respectively performed by the obtaining unit 201, the processing unit 202, and the output unit 203 shown in FIG. 9. According to another embodiment of this application, the units of the image processing apparatus shown in FIG. 9 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the image processing apparatus may also include other units, in an actual application, the functions may also be cooperatively implemented by other units and may be cooperatively implemented by a plurality of units.

According to another embodiment of this application, a computer program (including program code) that can perform the steps in the corresponding method shown in FIG. 6 may be run on a general computing device, such as a computer, which includes processing elements (processing circuitry) and storage elements (non-transitory computer-readable storage medium) such as a central processing unit (CPU), a random access memory (RAM), and a read-only memory (ROM), to construct the image processing apparatus shown in FIG. 9 and implement the image processing method in the embodiments of this application. The computer program may be recorded on, for example, a computer-readable recording medium, and may be loaded into the foregoing computing device by using the computer-readable recording medium and run on the computing device.

During the image processing in this embodiment of this application, a to-be-processed target image may be obtained first, a target image processing model may be then called to perform category prediction on the target image, to obtain a predicted category label of the target image and a predicted value of the predicted category label, and then, the predicted category label and the predicted value of the predicted category label may be outputted. Because the target image processing model is obtained through training by using the image processing method shown in FIG. 2 or FIG. 3, calling the target image processing model to perform category prediction on the target image can improve the accuracy of the predicted category label and the predicted value of the predicted category label.

Based on the descriptions of the foregoing method embodiments and apparatus embodiments, an embodiment of this application further provides a terminal. Referring to FIG. 10, the terminal includes at least a processor 301, an input device 302, an output device 303, and a computer storage medium 304. The processor 301, the input device 302, the output device 303, and the computer storage medium 304 in the terminal may be connected by a bus or in another manner.

The computer storage medium 304 may be stored in a memory of the terminal. The computer storage medium 304 is configured to store a computer program. The computer program includes program instructions. The processor 301 is configured to execute the program instructions stored in the computer storage medium 304. The processor 301 (or referred to as a central processing unit (CPU)) is a computing core and control core of the terminal, which is adapted to implement one or more instructions, and specifically, adapted to load and execute one or more instructions to implement corresponding method processes or corresponding functions. In an embodiment, the processor 301 described in this embodiment of this application may be configured to perform a series of image processing on the preset image processing model, including: obtaining a sample image, a category label of the sample image, and a label value of the category label, the label value being used for indicating whether the sample image includes an abnormal feature indicated by the category label. The processor 301 may be further configured to call a preset image processing model to perform segmentation processing on the sample image according to a feature similarity between pixels in the sample image, to obtain at least two sub-regions, and call the preset image processing model to perform category prediction on the sample image according to correlations between the sub-regions and the category label, to obtain a predicted value of the category label, the predicted value being used for indicating a probability that the sample image includes the abnormal feature indicated by the category label. The processor 301 may be further configured to update a network parameter of the preset image processing model according to center coordinates of the sub-regions, the label value of the category label, and the predicted value of the category label, and perform iterative training on the preset image processing model according to an updated network parameter, to obtain a target image processing model. In an embodiment, the processor 301 described in this embodiment of this application may be further configured to perform a series of image processing on a target image, including: obtaining a to-be-processed target image; calling a target image processing model to perform category prediction on the target image, to obtain a predicted category label of the target image and a predicted value of the predicted category label, the target image processing model being obtained by performing image processing on a preset image processing model by using the image processing method shown in FIG. 2 or FIG. 3, and the predicted value being used for indicating a probability that the target image includes an abnormal feature indicated by the predicted category label; and outputting the predicted category label and the predicted value of the predicted category label.

An embodiment of this application further provides a computer storage medium (memory). The computer storage medium is a memory device in a terminal and is configured to store programs and data. As can be understood, the computer storage medium herein may include a built-in storage medium in the terminal and certainly may further include an extended storage medium supported by the terminal. The computer storage medium provides storage space, and the storage space stores an operating system of the terminal, in addition, the storage space further stores one or more instructions suitable to be loaded and executed by the processor 301. The instructions may be one or more computer programs (including program code). The computer storage medium herein may be a high-speed RAM or a non-transitory memory, for example, at least one magnetic disk memory. Optionally, the computer storage medium may be at least one computer storage medium located away from the foregoing processor.

In an embodiment, one or more first instructions stored in the computer storage medium may be loaded and executed by the processor 301 to implement corresponding steps of the method in the foregoing embodiments related to image processing. In a specific implementation, the one or more first instructions in the computer storage medium are loaded and executed by the processor 301 to perform the following steps: obtaining a sample image, a category label of the sample image, and a label value of the category label, the label value being used for indicating whether the sample image includes an abnormal feature indicated by the category label. The instructions may further cause the processor 301 to call a preset image processing model to perform segmentation processing on the sample image according to a feature similarity between pixels in the sample image, to obtain at least two sub-regions, and call the preset image processing model to perform category prediction on the sample image according to correlations between the sub-regions and the category label, to obtain a predicted value of the category label, the predicted value being used for indicating a probability that the sample image includes the abnormal feature indicated by the category label. The instructions may further cause the processor 301 to update a network parameter of the preset image processing model according to center coordinates of the sub-regions, the label value of the category label, and the predicted value of the category label, and perform iterative training on the preset image processing model according to an updated network parameter, to obtain a target image processing model.

In an implementation, the preset image processing model sequentially includes a first network, a second network, and a third network, where the first network is configured to perform segmentation processing on the sample image according to the feature similarity between the pixels in the sample image, to obtain at least two sub-regions; and the second network and the third network are configured to perform category prediction on the sample image according to the correlations between the sub-regions and the category label, to obtain the predicted value of the category label.

In an implementation, when a preset image processing model is called to perform segmentation processing on the sample image according to a feature similarity between pixels in the sample image, to obtain at least two sub-regions, the one or more first instructions are loaded and executed by the processor 301 to specifically perform the following steps: calling the first network to perform feature extraction on the sample image to obtain initial feature values of the pixels in the sample image; and calling the first network to cluster the pixels in the sample image according to a feature similarity between the initial feature values of the pixels in the sample image to segment the sample image, to obtain at least two sub-regions, pixels in the same sub-region belonging to the same feature distribution.

In an implementation, when the preset image processing model is called to perform category prediction on the sample image according to correlations between the sub-regions and the category label, to obtain a predicted value of the category label, the one or more first instructions are loaded and executed by the processor 301 to specifically perform the following steps: calling the second network to perform pooling processing on initial feature maps of the sub-regions according to the label value of the category label, to obtain weights of the sub-regions, each initial feature map including initial feature values of pixels in a corresponding sub-region, the weights being used for reflecting the correlations between the sub-regions and the category label, and the weights being directly proportional to the correlations. The instruction further causing processor 301 to perform obtaining convolution feature maps of the sub-regions, and performing weighting processing on the convolution feature maps of the sub-regions according to the weights of the sub-regions, to obtain weighted feature maps of the sub-regions, and calling the third network to perform category prediction on the sample image according to the weighted feature maps of the sub-regions, to obtain the predicted value of the category label.

In an implementation, the at least two sub-regions include a reference sub-region, and the reference sub-region is any one of the at least two sub-regions; and correspondingly, when weighting processing is performed on the convolution feature maps of the sub-regions according to the weights of the sub-regions, to obtain weighted feature maps of the sub-regions, the one or more first instructions are loaded and executed by the processor 301 to specifically perform the following steps: determining a weight distribution map of the reference sub-region according to a weight of the reference sub-region and initial feature values of pixels in the reference sub-region, the weight distribution map including weights of the pixels in the reference sub-region. The instruction further causing processor 301 to perform weighting processing on a convolution feature map of the reference sub-region by using the weight distribution map of the reference sub-region, to obtain a weighted feature map of the reference sub-region.

In an implementation, when a weight distribution map of the reference sub-region is determined according to a weight of the reference sub-region and initial feature values of pixels in the reference sub-region, the one or more first instructions are loaded and executed by the processor 301 to specifically perform the following steps: performing normalization processing on the pixels in the reference sub-region to obtain probability values that the pixels in the reference sub-region belong to the reference sub-region. The instructions further causing processor 301 to perform binarization processing on the initial feature values of the pixels in the reference sub-region according to the probability values of the pixels in the reference sub-region and a probability threshold, to obtain a mask of the reference sub-region, the mask including feature values of the pixels in the reference sub-region alter the binarization processing. The instructions further causing processor 301 to calculate a product of the weight of the reference sub-region and the mask to obtain the weight distribution map of the reference sub-region.

In an implementation, when a network parameter of the preset image processing model is updated according to center coordinates of the sub-regions, the label value of the category label, and the predicted value of the category label, the one or more first instructions are loaded and executed by the processor 301 to specifically perform the following steps: updating a network parameter of the first network according to the center coordinates of the sub-regions and coordinates of the pixels in the sample image; and updating a network parameter of the second network and a network parameter of the third network according to a difference between the label value of the category label and the predicted value of the category label.

In an implementation, when a network parameter of the first network is updated according to the center coordinates of the sub-regions and coordinates of the pixels in the sample image, the one or more first instructions are loaded and executed by the processor 301 to specifically perform the following steps: obtaining a loss function of the first network, and calculating a value of the loss function according to the center coordinates of the sub-regions and the coordinates of the pixels in the sample image. The instructions further causing processor 301 to update the network parameter of the first network in a direction of reducing the value of the loss function.

In an implementation, the loss function of the first network includes a region concentration loss function and a distortion correction loss function; and correspondingly, when a value of the loss function is calculated according to the center coordinates of the sub-regions and the coordinates of the pixels in the sample image, the one or more first instructions are loaded and executed by the processor 301 to specifically perform the following steps: calculating a loss value of the region concentration loss function according to initial feature values of the pixels in the sample image, the coordinates of the pixels in the sample image, and the center coordinates of the sub-regions. The instructions further causing processor 301 to perform distortion processing on the sample image, and calculating a loss value of the distortion correction loss function according to an image obtained after the distortion processing and the sample image, the distortion processing including at least one of the following processing: angle rotation, pixel translation, image scaling, and chamfer changing. The instructions further causing processor 301 to calculate a sum of the loss value of the region concentration loss function and the loss value of the distortion correction loss function to obtain the value of the loss function.

In an implementation, the sample image is any medical image including a human body part, the preset image processing model is a model for performing disease category prediction on the medical image of the human body part, and the abnormal feature includes a disease feature of the human body part, where the human body part may include any one of the following: a knee, a foot, a hand, a neck, a head, and a waist.

In an embodiment, one or more second instructions stored in the computer storage medium may be loaded and executed by the processor 301 to implement corresponding steps of the method in the foregoing embodiments related to image processing. In a specific implementation, the one or more second instructions in the computer storage medium are loaded and executed by the processor 301 to perform the following steps: obtaining a to-be-processed target image, and calling a target image processing model to perform category prediction on the target image, to obtain a predicted category label of the target image and a predicted value of the predicted category label, the target image processing model being obtained by performing image processing on a preset image processing model by using the image processing method shown in FIG. 2 or FIG. 3, and the predicted value being used for indicating a probability that the target image includes an abnormal feature indicated by the predicted category label. The instructions further causing processor 301 to output the predicted category label and the predicted value of the predicted category label.

According to an aspect of this application, a computer program product or a computer program is provided, the computer program product or computer program including one or more first instructions, the first instructions being stored in a computer-readable storage medium. A processor of a computer device reads the first instructions from the computer-readable storage medium and executes the first instructions to cause the computer device to perform the foregoing image processing method shown in FIG. 2.

The computer program product or computer program includes one or more second instructions, the second instructions being stored in the computer-readable storage medium. The processor of the computer device reads the second instructions from the computer-readable storage medium and executes the second instructions to cause the computer device to perform the foregoing image processing method shown in FIG. 6.

In the process of performing image processing on the preset image processing model in this embodiment of this application, the preset image processing model may be called first to perform segmentation processing on the sample image according to a feature similarity between pixels in the sample image, to obtain at least two sub-regions. There is no need to segment and annotate the sub-regions in the sample image in advance, which can save annotation resources and improve segmentation efficiency.

The preset image processing model may then be called to perform category prediction on the sample image according to correlations between the sub-regions and the category label, to obtain a predicted value of the category label. The category prediction is implemented by analyzing the correlations between the sub-regions and category label, to further improve classification performance while segmenting the sub-regions, thereby improving the accuracy of category prediction to make the predicted value of the category label more accurate. Then, the network parameter of the preset image processing model may be updated according to the center coordinates of the sub-regions, the label value, and the more accurate predicted value, and iterative training may be performed on the preset image processing model according to the updated network parameter to obtain the target image processing model, thereby improving the accuracy of the target image processing model.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. An image processing method comprising:
obtaining a sample image, a category label of the sample image, and a label value of the category label, the label value indicating whether the sample image comprises an abnormal feature indicated by the category label;
calling a preset image processing model to perform segmentation processing on the sample image according to a feature similarity between pixels in the sample image, to obtain at least two sub-regions;
calling, by processing circuitry of a terminal, the preset image processing model to perform category prediction on the sample image according to correlations between the sub-regions and the category label, to obtain a predicted value of the category label, the predicted value indicating a probability that the sample image comprises the abnormal feature indicated by the category label;
updating, by the processing circuitry of a terminal, a network parameter of the preset image processing model according to center coordinates of the sub-regions, the label value of the category label, and the predicted value of the category label; and
performing iterative training on the preset image processing model according to the updated network parameter, to obtain a target image processing model.

2. The method according to claim 1, the preset image processing model sequentially comprising a first network, a second network, and a third network, wherein
the first network is configured to perform the segmentation processing on the sample image according to the feature similarity between the pixels in the sample image, to obtain the at least two sub-regions; and
the second network and the third network are configured to perform the category prediction on the sample image according to the correlations between the sub-regions and the category label, to obtain the predicted value of the category label.

3. The method according to claim 2, wherein the calling the preset image processing model to perform the segmentation processing comprises:
calling the first network to perform feature extraction on the sample image to obtain initial feature values of the pixels in the sample image; and
calling the first network to cluster the pixels in the sample image according to a feature similarity between the initial feature values of the pixels in the sample image to segment the sample image, to obtain the at least two sub-regions, pixels in the same sub-region belonging to a same feature distribution.

4. The method according to claim 2, wherein the calling the preset image processing model to perform the category prediction comprises:
calling the second network to perform pooling processing on initial feature maps of the sub-regions according to the label value of the category label, to obtain weights of the sub-regions, each initial feature map comprising initial feature values of pixels in a corresponding sub-region, the weights reflecting the correlations between the sub-regions and the category label, and the weights being directly proportional to the correlations;
obtaining convolution feature maps of the sub-regions, and performing weighting processing on the convolution feature maps of the sub-regions according to the weights of the sub-regions, to obtain weighted feature maps of the sub-regions; and
calling the third network to perform the category prediction on the sample image according to the weighted feature maps of the sub-regions, to obtain the predicted value of the category label.

5. The method according to claim 4, wherein the at least two sub-regions comprise a reference sub-region as one of the at least two sub-regions; and
the performing the weighting processing comprises:
determining a weight distribution map of the reference sub-region according to a weight of the reference sub-region and initial feature values of pixels in the reference sub-region, the weight distribution map comprising weights of the pixels in the reference sub-region; and
performing the weighting processing on a convolution feature map of the reference sub-region by using the weight distribution map of the reference sub-region, to obtain a weighted feature map of the reference sub-region.

6. The method according to claim 5, wherein the determining the weight distribution map of the reference sub-region comprises:
performing normalization processing on the pixels in the reference sub-region to obtain probability values that the pixels in the reference sub-region belong to the reference sub-region;
performing binarization processing on the initial feature values of the pixels in the reference sub-region according to the probability values of the pixels in the reference sub-region and a probability threshold, to obtain a mask of the reference sub-region, the mask comprising feature values of the pixels in the reference sub-region after the binarization processing; and
calculating a product of the weight of the reference sub-region and the mask to obtain the weight distribution map of the reference sub-region.

7. The method according to claim 2, wherein the updating the network parameter comprises:
updating a network parameter of the first network according to the center coordinates of the sub-regions and coordinates of the pixels in the sample image; and
updating a network parameter of the second network and a network parameter of the third network according to a difference between the label value of the category label and the predicted value of the category label.

8. The method according to claim 7, wherein the updating the network parameter of the first network comprises:
obtaining a loss function of the first network;
calculating a value of the loss function according to the center coordinates of the sub-regions and the coordinates of the pixels in the sample image; and
updating the network parameter of the first network in a direction of reducing the value of the loss function.

9. The method according to claim 8, wherein the loss function of the first network comprises a region concentration loss function and a distortion correction loss function; and
the calculating the value of the loss function comprises:
calculating a loss value of the region concentration loss function according to initial feature values of the pixels in the sample image, the coordinates of the pixels in the sample image, and the center coordinates of the sub-regions;
performing distortion processing on the sample image, and calculating a loss value of the distortion correction loss function according to an image obtained after the distortion processing and according to the sample image, the distortion processing comprising at least one of angle rotation, pixel translation, image scaling, or chamfer changing; and
calculating a sum of the loss value of the region concentration loss function and the loss value of the distortion correction loss function to obtain the value of the loss function.

10. The method according to claim 1, wherein the sample image is any medical image comprising a human body part, the preset image processing model is a model for performing disease category prediction on the medical image of the human body part, and the abnormal feature comprises a disease feature of the human body part; and
the human body part comprises any one of a knee, a foot, a hand, a neck, a head, or a waist.

11. An image processing method comprising:
obtaining a target image;
calling the target image processing model to perform the category prediction on the target image, to obtain the predicted category label of the target image and the predicted value of the predicted category label, the target image processing model being obtained by training the preset image processing model by using the image processing method according to claim 1, and the predicted value indicating the probability that the target image comprises the abnormal feature indicated by the predicted category label; and
outputting the predicted category label and the predicted value of the predicted category label.

12. An image processing apparatus, comprising:
processing circuitry configured to
obtain a sample image, a category label of the sample image, and a label value of the category label, the label value indicating whether the sample image comprises an abnormal feature indicated by the category label;
call a preset image processing model to perform segmentation processing on the sample image according to a feature similarity between pixels in the sample image, to obtain at least two sub-regions;
call the preset image processing model to perform category prediction on the sample image according to correlations between the sub-regions and the category label, to obtain a predicted value of the category label, the predicted value indicating a probability that the sample image comprises the abnormal feature indicated by the category label;
update a network parameter of the preset image processing model according to center coordinates of the sub-regions, the label value of the category label, and the predicted value of the category label; and
perform iterative training on the preset image processing model according to the updated network parameter, to obtain a target image processing model.

13. The apparatus according to claim 12, the preset image processing model sequentially comprising a first network, a second network, and a third network, wherein
the first network is configured to perform the segmentation processing on the sample image according to the feature similarity between the pixels in the sample image, to obtain the at least two sub-regions; and
the second network and the third network are configured to perform the category prediction on the sample image according to the correlations between the sub-regions and the category label, to obtain the predicted value of the category label.

14. The apparatus according to claim 13, wherein the processing circuitry is further configured to call the preset image processing model to perform the segmentation processing by
calling the first network to perform feature extraction on the sample image to obtain initial feature values of the pixels in the sample image; and
call the first network to cluster the pixels in the sample image according to a feature similarity between the initial feature values of the pixels in the sample image to segment the sample image, to obtain the at least two sub-regions, pixels in the same sub-region belonging to a same feature distribution.

15. The apparatus according to claim 13, wherein the processing circuitry is further configured to call the preset image processing model to perform the category prediction by
calling the second network to perform pooling processing on initial feature maps of the sub-regions according to the label value of the category label, to obtain weights of the sub-regions, each initial feature map comprising initial feature values of pixels in a corresponding sub-region, the weights reflecting the correlations between the sub-regions and the category label, and the weights being directly proportional to the correlations;
obtaining convolution feature maps of the sub-regions, and performing weighting processing on the convolution feature maps of the sub-regions according to the weights of the sub-regions, to obtain weighted feature maps of the sub-regions; and
calling the third network to perform the category prediction on the sample image according to the weighted feature maps of the sub-regions, to obtain the predicted value of the category label.

16. The apparatus according to claim 15, wherein the at least two sub-regions comprise a reference sub-region as one of the at least two sub-regions; and
the processing circuitry is further configured to perform the weighting processing by
determining a weight distribution map of the reference sub-region according to a weight of the reference sub-region and initial feature values of pixels in the reference sub-region, the weight distribution map comprising weights of the pixels in the reference sub-region; and performing the weighting processing on a convolution feature map of the reference sub-region by using the weight distribution map of the reference sub-region, to obtain a weighted feature map of the reference sub-region.

17. The apparatus according to claim 16, wherein the processing circuitry is further configured to determine the weight distribution map of the reference sub-region by performing normalization processing on the pixels in the reference sub-region to obtain probability values that the pixels in the reference sub-region belong to the reference sub-region;

performing binarization processing on the initial feature values of the pixels in the reference sub-region according to the probability values of the pixels in the reference sub-region and a probability threshold, to obtain a mask of the reference sub-region, the mask comprising feature values of the pixels in the reference sub-region after the binarization processing; and calculating a product of the weight of the reference sub-region and the mask to obtain the weight distribution map of the reference sub-region.

18. The apparatus according to claim 13, wherein the processing circuitry is configured to update the network parameter by updating a network parameter of the first network according to the center coordinates of the sub-regions and coordinates of the pixels in the sample image; and updating a network parameter of the second network and a network parameter of the third network according to a difference between the label value of the category label and the predicted value of the category label.

19. An image processing apparatus, comprising:
processing circuitry configured to
obtain a target image;
call the target image processing model to perform the category prediction on the target image, to obtain the predicted category label of the target image and the predicted value of the predicted category label, the target image processing model being obtained by training the preset image processing model by using the image processing method according to claim 1, and the predicted value indicating the probability that the target image comprises the abnormal feature indicated by the predicted category label; and output the predicted category label and the predicted value of the predicted category label.

20. A non-transitory computer-readable storage medium storing computer-readable instructions thereon, which, when executed by a terminal, cause the terminal to perform:

obtaining a sample image, a category label of the sample image, and a label value of the category label, the label value indicating whether the sample image comprises an abnormal feature indicated by the category label;

calling a preset image processing model to perform segmentation processing on the sample image according to a feature similarity between pixels in the sample image, to obtain at least two sub-regions;

calling the preset image processing model to perform category prediction on the sample image according to correlations between the sub-regions and the category label, to obtain a predicted value of the category label, the predicted value indicating a probability that the sample image comprises the abnormal feature indicated by the category label;

updating a network parameter of the preset image processing model according to center coordinates of the sub-regions, the label value of the category label, and the predicted value of the category label; and performing iterative training on the preset image processing model according to the updated network parameter, to obtain a target image processing model.

* * * * *